Aug. 29, 1950
E. J. RIVOCHE
2,520,891
DRYING OF STARCHY FOODSTUFFS
Filed Jan. 27, 1948
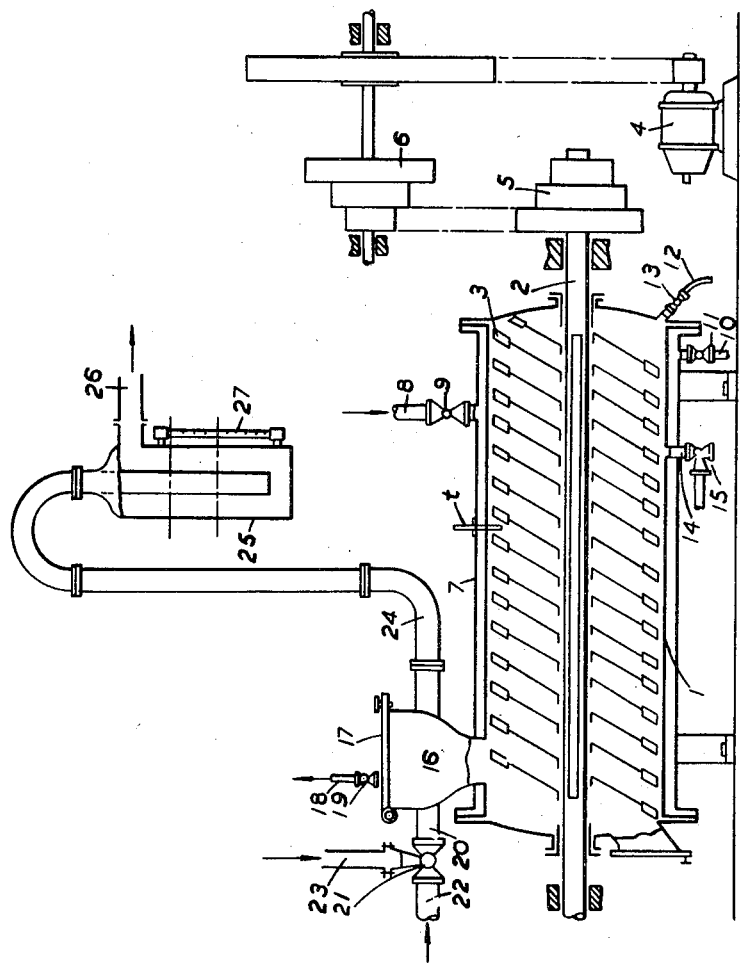
Inventor
Eugene Joel Rivoche
By
Pennie Edmonds Morton & Barrows
Attorney Patented Aug. 29, 1950

2,520,891

UNITED STATES PATENT OFFICE 2,520,891

DRYING OF STARCHY FOODSTUFFS

Eugene Joel Rivoche, Washington, D. C., assignor to Farmers Marketing and Supply Company Limited, London, England Application January 27, 1948, Serial No. 4,533
In Great Britain September 16, 1939

Section 1, Public Law 690, August 8, 1946
Patent expires September 16, 1959

19 Claims. (Cl. 99—199)

The present invention relates to the treatment of moisture and starch containing vegetable foodstuffs such as potatoes, to produce a readily reconstitutable dried product in the form of finely-divided particles.

The invention is concerned with moisture and starch containing vegetable foodstuffs of all kinds which are normally cooked prior to eating, for example, potatoes.

An object of the present invention is to obtain dried products which when reconstituted by mixing with a sufficient quantity of warm or hot water, give rise to a product of highly palatable and readily assimilable character. The invention thus allows the manufacture of products from potatoes, beans, peas and the like, which, when treated in the manner above described, yield a food dish which is similar to a like dish prepared from fresh vegetables.

When vegetables such as potatoes, are subjected, in a condition of approximately their normal moisture content, to a hot drying operation, the vegetable under treatment tends to become sticky with various undesirable results, notably that the cellular structure becomes impaired. Such treatment may in some cases result in hardened dry products which must be soaked for undesirably long periods before complete softening takes place. Moreover, such treatment being necessarily prolonged in order to complete the drying, the quality and flavour of food dishes prepared from the final product is adversely affected.

In contra-distinction to the foregoing the present invention enables moisture extraction to be carried to any convenient extent so that the final moisture content of the product may be as low as may be desired and yet on treatment with water the dried products will immediately re-absorb water and form food dishes which are practically identical in character with similar food dishes prepared from the fresh vegetables. As the structure of the vegetable solids, including the capillary properties thereof is not substantially impaired, the appearance as well as the flavour of the reconstituted food dishes are practically identical with those of corresponding food dishes prepared from fresh vegetables.

I have found that the operations required in the course of any known method of hot drying must be limited as far as possible in order to avoid the prolonged treatment which would adversely affect the structure and the flavour of the product, as well as its capacity for reconstitution with water and its flavour and appearance qualities when reconstituted.

I have found moreover that it is very advantageous to cool the vegetable after it has been cooked and before the final hot drying operation, and that other steps involving a minimum usage of heat may be adopted with advantage.

According to the present invention there is provided a method of treating a moisture containing vegetable foodstuffs, particularly a starch containing vegetable, such as potatoes, to produce a readily reconstitutable dried product, which method comprises cooking the vegetable, cooling it to a temperature at least as low as 4° C., or freezing it, reducing the moisture content, and thereafter drying it by the application of heat, the moisture content of the vegetable being reduced until the weight of the cooked vegetable is from 45% to 80% of the initial weight thereof, depending upon the moisture content and the nature of the original vegetable.

According to a further feature of the present invention the vegetable foodstuff after being cooked is cooled to a temperature approaching or even dropping below the freezing point of water before being subjected to the hot drying action. The cooling or freezing of the cooked vegetable is found to induce a segregation of the water contained in the vegetable material and thereby to assist the removal of a substantial portion of the same before drying under heat is attempted.

For the purpose of removing a substantial portion of the water released from the cooled or frozen cooked vegetable various measures may be adopted. However, if the cooked vegetable has been frozen to facilitate segregation of moisture, the temperature of the vegetable must be raised to above the freezing temperature of the moisture so that it may be removed. Thus for example, the cooked vegetable may be centrifuged, with gentle heat if necessary before hot drying is attempted. Or the vegetable material may be acted upon by absorbent rollers, for example, cloth covered rollers, which may be gently heated for the purpose of removing the liberated water. Another possible method is to subject the cooked vegetable to gentle heat and reduced pressure conditions. Any such gentle heating whether by absorbent rollers or otherwise must be such as to avoid the creation of a product temperature exceeding 50° C. Finally the cooled or frozen cooked vegetable may be thoroughly mixed with a previously prepared dry powder of the same vegetable to produce a lower percentage moisture content than has the cooled or frozen cooked vegetable.

The amount of moisture to be removed by the foregoing or similar steps before the hot drying operation will depend upon the moisture content and upon the nature of the original vegetable. As a general rule, the moisture content of the material subjected to the final hot drying should preferably be 50% or less.

In order to produce a material with the moisture content requisite for carrying out the final hot drying stage of the method, if the moisture lost in the cooking operation and during the subsequent cooling or freezing is not sufficient, the material may be treated by all or any of the methods described or by a combination of them in order to achieve a moisture content not exceeding 50% in the case of starchy vegetables or of any other proportion of moisture within the limits stated as may be required. The product can then be hot dried very rapidly and economically without recourse to high temperature. Such a rapid drying process obtained by a heating medium at comparatively low temperature, say 100° to 110° C., is not only economical but also avoids unfavourable effects on the nature and quality of the final product.

In carrying out the invention, the vegetable foodstuff may be cooked in a closed receptacle suitably heated. When the cooking is complete the material is then subjected to cooling or freezing with the simultaneous elimination of moisture, that is to say the moisture content is allowed to evaporate preferably under reduced pressure or in a current of air, so utilising as far as possible the whole heat content of the cooked material in reducing the water content. If, as the result of this operation, the product contains less than 50% by weight of moisture, it may then be transferred directly to the hot drying operation by which this moisture content is further reduced rapidly to the desired level, preferably below 12% by weight.

If, on the other hand, after cooling or freezing in the manner described the material still contains more than 50% by weight of moisture then use may be made of one or more of the physical or mechanical methods proposed as means for reducing the water content. Finally, use may be made for the purpose of attaining the desired reduced moisture content, of the property of readily absorbing moisture possessed by the products ultimately resulting according to the invention, in that a product of this kind may be admixed with the material containing excess of moisture and thoroughly incorporated therewith, yielding a mixture in which the percentage moisture content is reduced below 50% by weight, so that this product can then be subjected to the final drying stage with safety. This method of reduction of the percentage of moisture content by addition of dry material is effected by intimate admixture of the dry and the moist materials so as to enable the dry material to absorb moisture from the moist material, so that no part of the mixture shall contain more than 50% by weight of moisture.

In order that the present invention may be more clearly understood and readily carried into effect, reference may now be had to the accompanying drawing illustrating the same by way of example, the single figure being a diagrammatic view of one form of apparatus for carrying out the method described.

The apparatus shown in the drawing comprises essentially a horizontal fixed drum 1 adapted to be closed in a hermetic fashion and in which a central spindle 2 carrying a series of paddles 3 is arranged. These paddles are opposed so as to work like a cross-mill. The spindle is set in operation in any appropriate fashion, for example, with the aid of an electric motor. The transmission from the motor to the spindle 2 is such that it is possible to turn the latter at various speeds. In the drawing the transmission is effected with the aid of the pulleys 5 and 6 of differing diameters, but any other form of speed gear can be used. The drum is surrounded by a spaced jacket 7 which enables a fluid, vapour or air to circulate in the space between it and the cylinder, the fluid being delivered to the space by the tubing 8 furnished with the cock 9. The fluid or liquid contents of the drum can issue therefrom through the tubing 10 provided with a cock 11. In the same way the tube 12 provided with a cock 13 permits the removal from the drum of liquid which may condense in the interior thereof.

Tube 14 with a cock 15 allows the introduction into the drum of gas or vapour, in general hot air. An inlet 16 mounted on the drum 1 permits the charging of the drum with the vegetable foodstuff to be treated as well as the subsequent introduction of dry materials, by the raising of the cover 17 into which opens a conduit 18 furnished with a cock 19 by means of which hot air which is introduced at 14 or which is formed during the drying operation can leave the drum.

Into the inlet 16 on the one hand there opens a conduit 20 provided with a three-way cock 21 which allows dry steam to enter the conduit 20 by way of the tube 22, or steam or water by way of tube 23.

Finally, the inlet 16 is connected by means of a conduit 24 to a condensing chamber 25 to which is connected by means of a conduit 26 a vacuum pump. A sight glass 27 provides indication of the level of the water in the condensing chamber 25.

A thermometer $t$ mounted in the drum 1 allows the observation at any instant of the temperature within the drum. A thermometer may also be provided to indicate the temperature in the space between the drum 1 and the jacket 7. In like manner any other measuring devices of temperature, pressure, humidity and the like may be provided.

The drum 1 which has been described is an ordinary drier which has been specially equipped to function in accordance with the method according to the invention and it permits of effecting in the same apparatus the cooking operation and the drying operation and in general all the essential stages of the method. The apparatus described functions in the following manner:

The vegetable foodstuff to be cooked (potato, for example), is introducing into the drum 1 and is there raised to the cooking temperature either by means of hot air introduced through the tube 14, or by means of steam introduced by the conduits 22, 20.

During the heating the water withdrawn from the foodstuff treated is removed from the drum 1 by the tube 12 or by the conduit 26. It is also possible to assist the heating by introducing steam into the interior of the jacket 7 through the tube 8 so as to heat the drum 1 exteriorly. With the aid of the apparatus described, it is possible readily to control the cooking operation, by controlling the duration of the treatment and the introduction of the hot air or the steam. In any event care should be exercised to avoid the application of a temperature above 105° C. The superfluous moisture can be removed readily either through the tube 12 or through the tube 24.

It will be seen that control of the apparatus with the aid of the devices indicated above is very simple and that changes in the conditions in the drum 1 can be effected very rapidly. The foodstuff being thus cooked one proceeds to cool or even freeze it in the drum 1. This cooling or freezing may be effected by setting up in the drum a vacuum, thereby utilizing the heat accumulated in the product during cooking for evaporation purposes and at the same time obtaining the desired cooling or freezing of the product. Alternatively, or in addition, cooling may be effected or assisted by introducing into the space between the jacket 7 and the drum 1, by means of the tubing 8, a current of cold water. If desired, a current of dry cold air under pressure may be introduced through the conduit 14 to accelerate the cooling and reduce the duration of the operation for the purpose of avoiding any fermentation which might be produced if the cooling were too slow. When the foodstuff is cold it is stirred by slowly turning the spindle 2 provided with the paddles 3. It should be noted that during the operation of cooking the spindle 2 is not turned, or else is turned very slowly, for example at the rate of about two turns a minute, so as not to affect adversely the foodstuff, the slow rotation having simply as its object the equalisation of the temperature in the interior of the mass. If the material after cooling to a temperature at least as low as 4° C., or freezing contains 50% or less of water it is then usually in a condition fit to be rendered into damp powder which may be rapidly done by starting or increasing the rotation of the spindle at from 14 to 40 R. P. M. approximately depending on the speed which is found to yield the maximum disintegration, or by passing the product through a 20 mesh sieve whilst using as little pressure as possible. Alternatively the admixture of sufficient absorbent dry material may be effected in the same machine or otherwise as desired, for the purpose of facilitating the production of a fine damp powder.

In the arrangement which has been described, it has been supposed that the two operations of cooking and cooling or freezing subsequently in vacuum are effected in one and the same apparatus, but it is to be understood that this is not indispensable for carrying out the method of the invention. It is possible, for example, to effect the cooking in a separate apparatus and the cooling or freezing of the material in another, or alternatively, when the foodstuff treated contains a considerable proportion of water, the water may be removed by means of a centrifuge by cloth rollers or by other means proposed simultaneously with or after the cooling operation. It will be found that either or any of these operations will tend by their own mechanical actions to reduce the material into the form of a damp powder, but should this in some instances not take place the addition of sufficient dry powder to guarantee the reduction of water to 50% or less will rapidly yield damp powder if the mixture is stirred within the range of approximately 14 to 40 R. P. M.

The subsequent hot drying operation may also be effected in the drum 1 by passing hot air or steam through the space between the jacket 7 and the drum 1. During the drying operation the spindle 2 is turned slowly so as to prevent the vegetable from agglomerating, and depending upon the nature of the vegetable, a scraper to remove particles or films from the surface of the drum may be introduced with advantage. Alternatively, the hot drying operation may be effected in a separate apparatus of a type suitable to the purpose.

I claim:

1. The method of treating a vegetable foodstuff containing moisture and starch, which comprises cooking the vegetable foodstuff, cooling it to a temperature at least as low as 4° C., initially reducing the moisture content of the cooked foodstuff until the weight of the foodstuff is from 45% to 80% of the initial weight thereof and while the foodstuff is at a temperature above the freezing temperature of the contained moisture, and thereafter subjecting the foodstuff of reduced moisture content to a final drying operation until its moisture content has been substantially further reduced and a dry, readily-reconstitutable product is obtained.

2. The method of claim 1 in which the temperature of the cooked foodstuff is not permitted to rise substantially above 50° C. during said initial and final drying operations.

3. The method of claim 1 in which the cooling of the cooked foodstuff is sufficient to freeze it.

4. The method of claim 1 in which the initial drying of the foodstuff is by application of heat.

5. The method of claim 1 in which the initial drying of the foodstuff is obtained by heated air brought into direct contact therewith.

6. The method of claim 1 in which the temperature of the cooked foodstuff is at least in part reduced and the reduction of the moisture content thereof is at least in part obtained by subjecting the cooked foodstuff while still hot from the cooking operation to evaporative cooling under reduced pressure.

7. The method of claim 1 in which the initial drying includes removal of moisture by absorption.

8. The method of claim 1 in which at least a portion of the water is removed during the initial operation by bringing the cooked foodstuff into direct contact with a heated absorbent material.

9. The method of claim 1 in which the initial drying includes the removing of moisture mechanically from the foodstuff.

10. The method of claim 1 in which at least a portion of the water is removed from the foodstuff during the initial drying operation by centrifuging.

11. The method of claim 1 in which moisture is removed from the foodstuff while it is maintained under a reduced pressure.

12. The method of claim 1 in which the foodstuff is cooled by passing a current of cool air through it.

13. The method of claim 1 in which the foodstuff is stirred while the moisture content thereof is being reduced.

14. The method of treating a vegetable foodstuff containing moisture and starch, which comprises cooking the vegetable foodstuff, cooling it to a temperature at least as low as 4° C., initially reducing the moisture content of the cooked foodstuff until the weight of the foodstuff is from 45% to 80% of the initial weight thereof and while the foodstuff is at a temperature above the freezing temperature of the contained moisture, and thereafter subjecting the foodstuff of reduced moisture content to a final drying operation until its moisture content has been substantially further reduced and a dry, readily-reconstitutable product is obtained, the foodstuff being disintegrated into relatively small particles before the final drying operation.

15. The method of treating a vegetable foodstuff containing moisture and starch, which comprises cooking the vegetable foodstuff, cooling it to a temperature at least as low as 4° C., initially reducing the moisture content of the cooked foodstuff until the weight of the foodstuff is from 45% to 80% of the initial weight thereof and while the foodstuff is at a temperature above the freezing temperature of the contained moisture, said initial reduction of the moisture content of the foodstuff being at least in part obtained by admixing the cooked foodstuff with previously dried foodstuff of the same kind, and thereafter subjecting the foodstuff of reduced moisture content to a final drying operation until its moisture content has been substantially further reduced and a dry, readily-reconstitutable product is obtained.

16. The method of preparing cooked starchy vegetable foodstuff, in readily-reconstitutable form, from a mass of the cooked vegetable, which comprises performing successively and in the order set forth, the steps of thoroughly mixing the same with the same kind of dried and powdered vegetable foodstuff in amount to produce a resultant mixture containing not more than about 50% by weight of moisture, and drying said resultant mixture to form the readily-reconstitutable product, said drying operation being carried out so as to preserve substantially the structure of the vegetable solids, including capillary properties thereof.

17. The method of claim 16 in which said resultant mixture is subjected to a sieving operation to disintegrate it into relatively small particles before it is subjected to the final drying operation.

18. The method of claim 16 in which the cooked foodstuff to which the dried foodstuff of the same kind is added is cooled to at least 4° C.

19. The method of claim 16 in which the cooked foodstuff to which the dried foodstuff of the same kind is added is cooled sufficiently to freeze it, and subsequently is raised to above the freezing temperature of the contained moisture before the initial drying operation.

EUGENE JOEL RIVOCHE.

REFERENCES CITED

The following references are of record in the file of this patent:

UNITED STATES PATENTS

| Number | Name | Date |
| --- | --- | --- |
| 2,352,670 | Volpertas | July 4, 1944 |
| 2,381,838 | Rendle | Aug. 7, 1945 |
| 2,439,119 | Willets et al. | Apr. 6, 1948 |

FOREIGN PATENTS

| Number | Country | Date |
| --- | --- | --- |
| 26,001 | Great Britain | Sept. 16, 1939 |
| 32,321 | Great Britain | Dec. 15, 1939 |